April 30, 1968    F. J. KIRK    3,380,122
MOLD FOR MAKING AN ATTACHMENT DEVICE
Filed Feb. 1, 1966    4 Sheets-Sheet 1
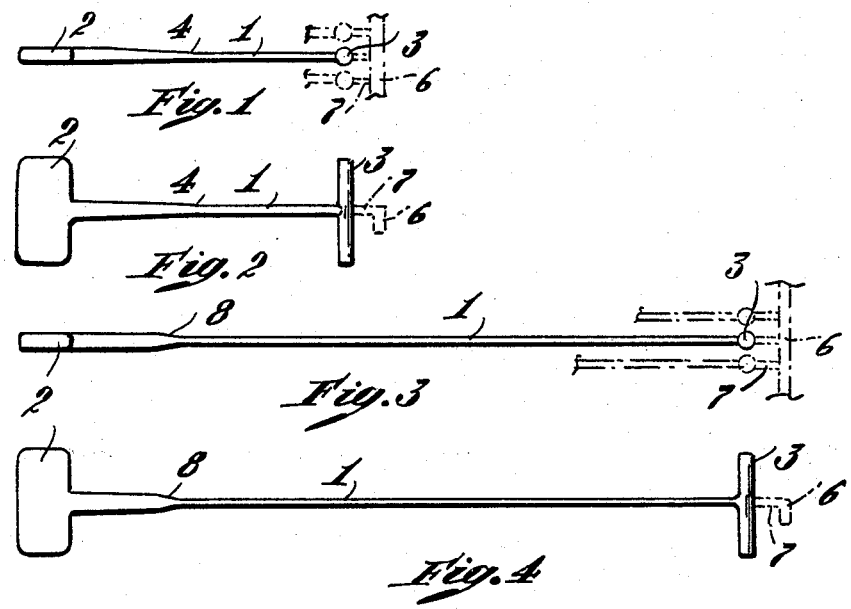
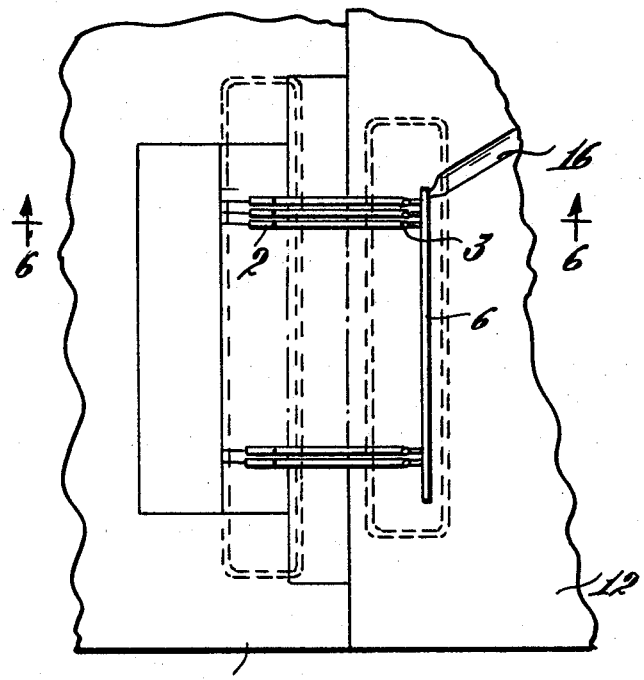
Inventor
Fred Jewett Kirk
by Roberts, Cushman & Grover
ATT'YS United States Patent Office 3,380,122
Patented Apr. 30, 1968

3,380,122
MOLD FOR MAKING AN ATTACHMENT DEVICE
Fred Jewett Kirk, Lancaster, Mass., assignor to Dennison Manufacturing Company, Framingham, Mass., a corporation of Nevada
Filed Feb. 1, 1966, Ser. No. 523,998
1 Claim. (Cl. 18—42)

ABSTRACT OF THE DISCLOSURE

For making an attachment device having a thermoplastic filament, apparatus comprising a mold having means for stretching the filament while still in the mold.

---

This invention relates to devices for attaching articles together, such as a tag to merchandise or a button to a garment, and more particularly to devices comprising a filament, a head on one end of the filament and a cross-bar fast to the other end of the filament intermediate the ends of the cross-bar, all parts of the device comprising thermoplastic material and being integral.

The filament should be small but strong and should be very flexible, especially adjacent the cross-bar. As disclosed in the patent to Bone 3,103,666 it has been proposed to mold the devices but it has not been possible to mold them with filaments fine enough or strong enough.

Objects of the present invention are to provide devices of the kind referred to which have filaments which are both fine and strong and which are very flexible adjacent the aforesaid cross-bar.

In one aspect the invention involves a mold for an attachment device comprising a filament, a head on one end of the filament and a cross-bar fast to the other end of the filament intermediate the ends of the cross-bar, all parts of the device comprising thermoplastic material and being integral, said filament being stretched to reduce its cross-sectional dimensions and increase its strength by rearranging the molecules of the thermoplastic material. The best materials found so far are nylon, polypropylene and polyethylene. In another aspect the invention involves a mold for use in the method of manufacture which comprises molding the device and then stretching said filament to reduce its cross-sectional dimensions and increasing its strength by rearranging the molecules of the thermoplastic material. In still another aspect the invention involves apparatus for making the device which comprises parts having relative movement away from each other, abutments on the parts facing away from each other and engageable with the opposing faces of said head and cross-bar, and means for producing said movement to stretch said filament. The blank for making the aforesaid filament preferably has minimum diameter adjacent said cross-bar and maximum diameter adjacent said head and increased diameter toward said head throughout a portion of its length.

In a typical embodiment of the invention the dimensions of filament are as follows: before stretching, 1.0" length, .035" minimum diameter and .050" maximum diameter; after stretching, 2.5" length, .020 minimum diameter and .050" maximum diameter.

Figure 6:
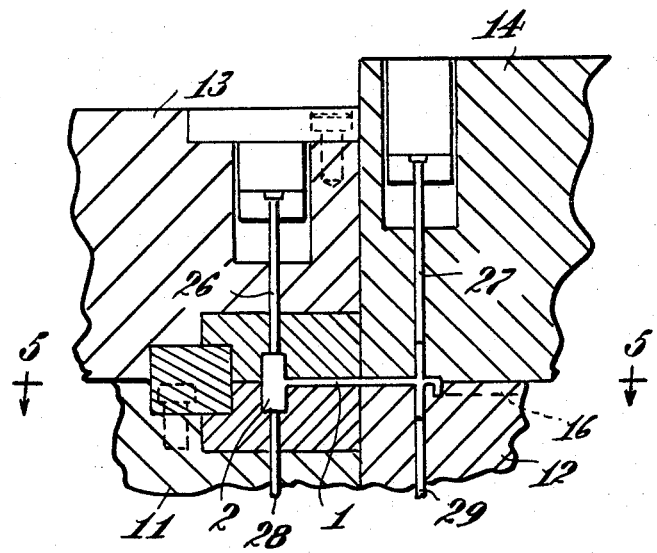
Figure 7:
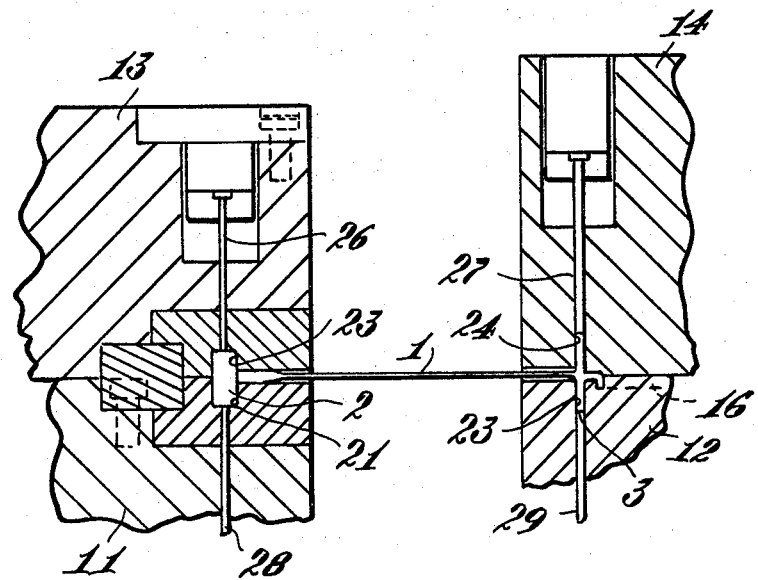
Figure 8:
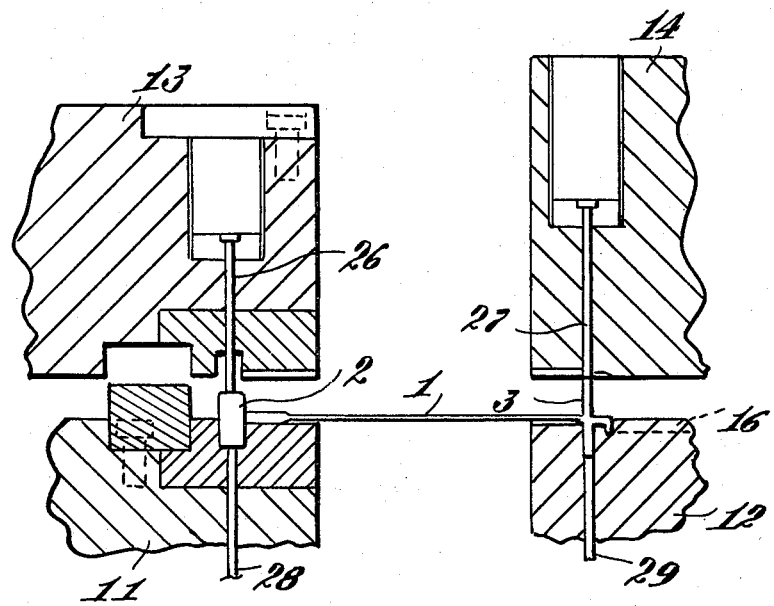
Figure 9:
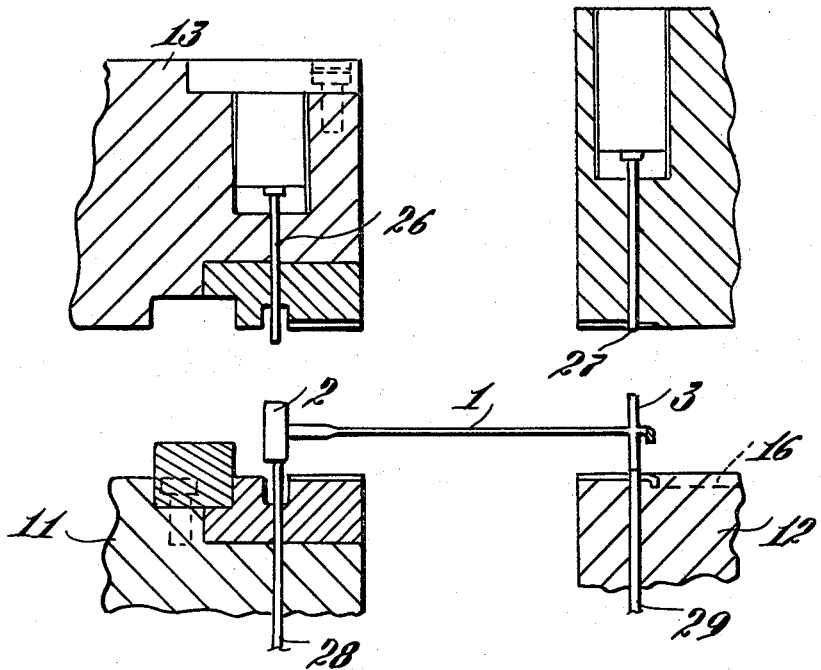
Figure 10:
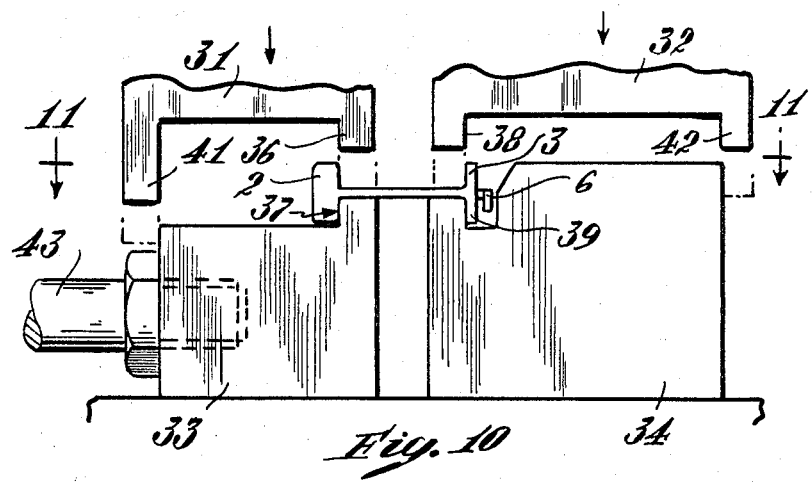
Figure 11:
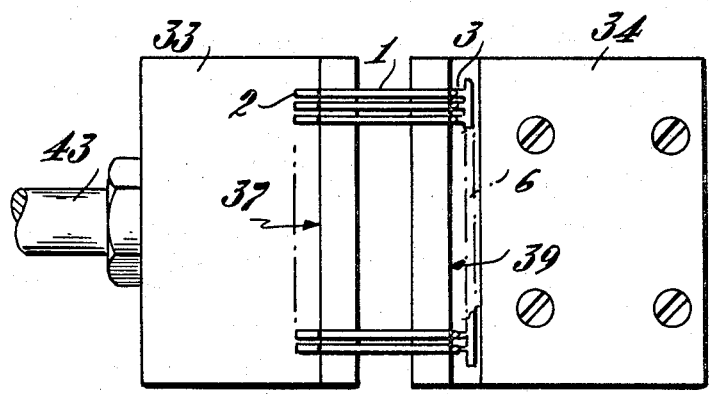

For the purpose of illustration typical embodiments of the invention are shown in the accompanying drawings in which FIGS. 1 and 2 are side views of the aforesaid blank;
FIGS. 3 and 4 are side views of a finished attachment device;
FIG. 5 is a section on line 5—5 of FIG. 6;
FIG. 6 is a section on line 6—6 of FIG. 5;
FIGS. 7 to 9 are sections similar to FIG. 6 showing successive steps in making the device;
FIG. 10 is a side view of apparatus for stretching the filament after the devices have been formed in a conventional mold;
FIG. 11 is a plan view from line 11—11 of FIG. 10; and
FIG. 12 is a view like FIG. 11 after the filaments have been stretched.

The blank shown in FIGS. 1 and 2 comprises a filament 1, a head 2 on one end of the filament, and a cross-bar 3 fast to the other end of the filament, all parts of the device comprising a single integral piece of nylon or other thermoplastic material in which the molecules are reoriented when the material is stretched thereby to strengthen the material. The filament 1 has minimum diameter adjacent the cross-bar and increased diameter toward the head from 4 approximately half its length. Preferably a plurality of the devices are molded together, the devices being connected by a rod 6 integrally joined to the cross-bars by necks 7. After the devices are molded the filaments are stretched to reduce their diameters as shown in FIGS. 3 and 4. Owing to variation in diameter of each filament, the portion of smallest diameter from 4 to the crossbar 3 first stretches substantially to its elastic limit and then the stretching progresses from 4 toward the head 2. In the illustration the stretching is continued until it reaches point 8 adjacent the head. The stretching is preferably stopped before reaching the head to avoid the danger of breaking the filament. This stretching not only reduces the diameter of the filament beyond the molding limit but, by reorienting the molecules of the thermoplastic material, it increases the tensile strength (p.s.i.) of the filament. While the devices may be severed from the necks 7 at any time after molding, preferably the devices are left interconnected in groups until they are used and are then severed successively as needed.

The mold shown in FIGS. 5 to 9 comprises four parts 11, 12, 13 and 14 which abut each other as shown in FIG. 6 while the thermoplastic material is being injected through the inlet 16 at some point at the end or along the length of rod 6. After the devices are molded the parts 11 and 13 are separated from the parts 12 and 14 as shown in FIG. 7, the parts having abutments 21, 22, 23 and 24 abutting the opposing faces of the heads 2 and cross-bars 3, thereby to stretch the filaments. After the filaments are stretched the devices are removed from the molds in the usual manner as follows. Parts 11 and 12 are separated from the parts 13 and 14 while pins 26 and 27 are advanced to eject the devices from the parts 13 and 14 (FIG. 8). Then the pins 28 and 29 are advanced to eject the devices from the parts 11 and 12 (FIG. 9).

Figure 12:
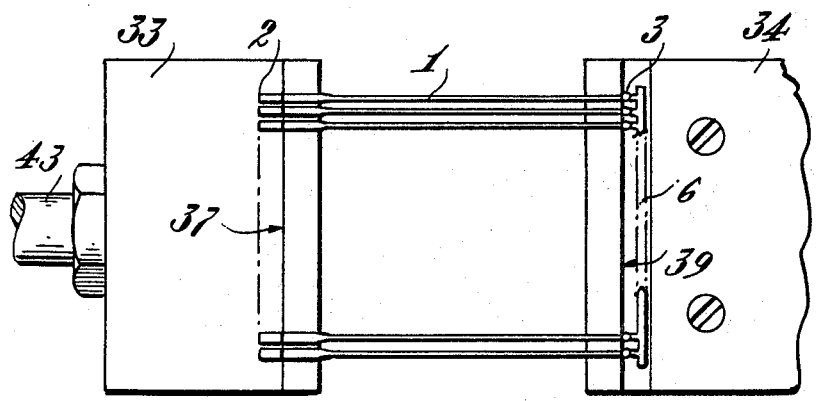

The modification shown in FIGS. 10 to 12 comprises upper parts 31 and 32 and lower parts 33 and 34. The parts 31 and 33 have abutments 36 and 37 abutting the heads 2 and the parts 32 and 34 have abutments 38 and 39 abutting the cross-bars 3. With the upper parts raised as shown in full lines in FIG. 10 a group of attachment devices 1-2-3 are dropped into position on the lower parts and the upper parts are lowered to the position shown in broken lines in FIG. 10. Then the parts 31 and 33 are moved away from the parts 32 and 34 from the position shown in FIGS. 10 and 11 to the position shown in FIG. 12. Inasmuch as the parts 31 and 32 have shoulders 41 and 42 overlapping the lower parts they are held against movement relatively to the lower parts during the stretching operation. The parts are moved as aforesaid by any suitable means as for example by piston and cylinder means 43. While the upper parts 31 and 32 may be lifted by hand, they to are preferably operated pneumatically.

It should be understood that the present disclosure is for the purpose of illustration only and that this invention includes all modifications and equivalents which fall within the scope of the appended claim.

I claim:
1. For making an attachment device comprising a filament, a head on one end of the filament and a cross-bar fast to the other end of the filament, all portions of the device comprising thermoplastic material and being integral, apparatus comprising parts having relative movement away from each other, abutments on the parts facing away from each other and engageable with the opposing faces of said head and cross-bar, and means for producing said movement to stretch said filament, said parts being molds for molding the devices before stretching.

References Cited

UNITED STATES PATENTS

| | | |
|---|---|---|
| 2,739,349 | 3/1956 | Strauss. |
| 3,183,552 | 5/1965 | Farkas. |
| 3,196,483 | 7/1965 | Eyles. |

J. HOWARD FLINT, JR., *Primary Examiner.*